(12) United States Patent
Cruse

(10) Patent No.: US 12,076,876 B1
(45) Date of Patent: Sep. 3, 2024

(54) DEVICE AND METHOD FOR REMOVING AGRICULTURAL STORAGE BAG FROM STORED PRODUCT

(71) Applicant: Robert Douglas Cruse, Tillamook, OR (US)

(72) Inventor: Robert Douglas Cruse, Tillamook, OR (US)

( * ) Notice: Subject to any disclaimer, the term of this patent is extended or adjusted under 35 U.S.C. 154(b) by 325 days.

(21) Appl. No.: 17/709,188

(22) Filed: Mar. 30, 2022

Related U.S. Application Data

(60) Provisional application No. 63/175,266, filed on Apr. 15, 2021.

(51) Int. Cl.
| | | |
|---|---|---|
| *B26D 1/00* | (2006.01) | |
| *A01F 25/14* | (2006.01) | |
| *B26D 1/04* | (2006.01) | |
| *B26D 5/10* | (2006.01) | |

(52) U.S. Cl.
CPC ............. *B26D 1/04* (2013.01); *A01F 25/14* (2013.01); *B26D 1/0006* (2013.01); *B26D 2001/004* (2013.01); *B26D 5/10* (2013.01)

(58) Field of Classification Search
CPC .............. B65B 69/0033; B65B 69/008; B65B 69/0025; B62D 3/001; A01F 25/2036; A01F 2025/2054; A01F 25/14; A01F 25/20; A01F 25/2027
USPC ......................................................... 414/412
See application file for complete search history.

(56) References Cited

U.S. PATENT DOCUMENTS

| | | | | |
|---|---|---|---|---|
| 2,820,282 A | * | 1/1958 | Schneider, Jr. | B65B 69/0025 30/2 |
| 3,855,886 A | * | 12/1974 | Andrews | B26D 3/001 83/54 |
| 4,781,089 A | * | 11/1988 | Gerber | B26D 3/001 83/191 |
| 5,303,460 A | * | 4/1994 | Neilsen | B65B 69/0025 83/909 |
| 5,406,690 A | * | 4/1995 | Neilsen | B65B 69/0025 29/33 F |
| 6,761,098 B1 | * | 7/2004 | Esping | B65B 69/0033 83/578 |
| 8,371,791 B2 | * | 2/2013 | Kenna | A01K 5/005 241/101.76 |
| 2017/0064908 A1 | * | 3/2017 | Sell | B26D 3/08 |

* cited by examiner

*Primary Examiner* — Mark C Hageman
(74) *Attorney, Agent, or Firm* — Plager Schack LLP; Mark H. Plager, Esq.; Kara K. Verryt, Esq.

(57) ABSTRACT

A device for removing an agricultural storage bag from a stored product may include a cutter assembly operatively attached to a pulling assembly. The pulling assembly may be configured to pull the cutter assembly along a resting surface of the agricultural storage bag to remove the agricultural storage bag from the stored product. The pulling assembly may include a stop plate, a frame, and a winch mounted to the frame. The cutter assembly may include a skid, a cutter blade attached to a top surface of the skid, and a fanning mechanism attached to the top surface of the skid.

8 Claims, 5 Drawing Sheets

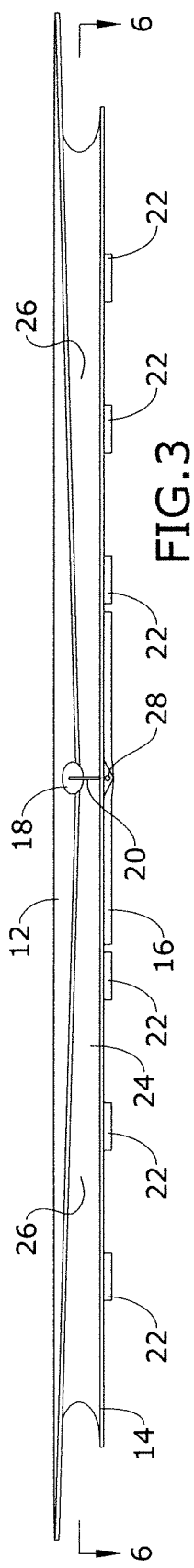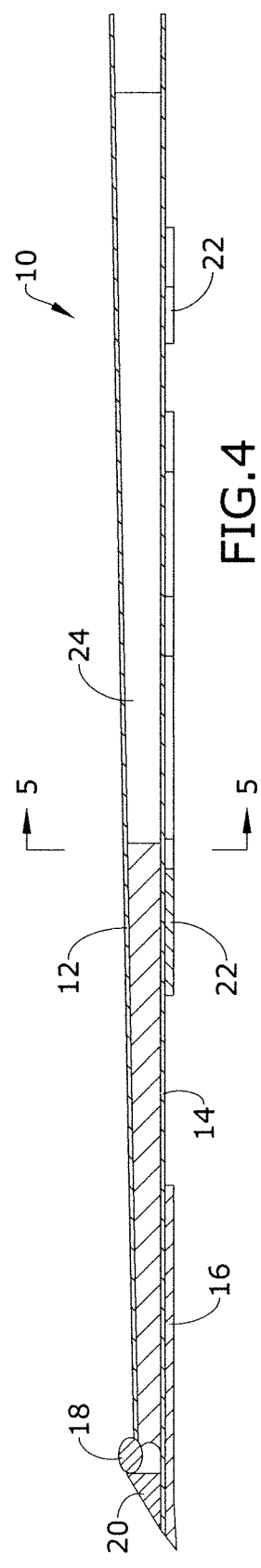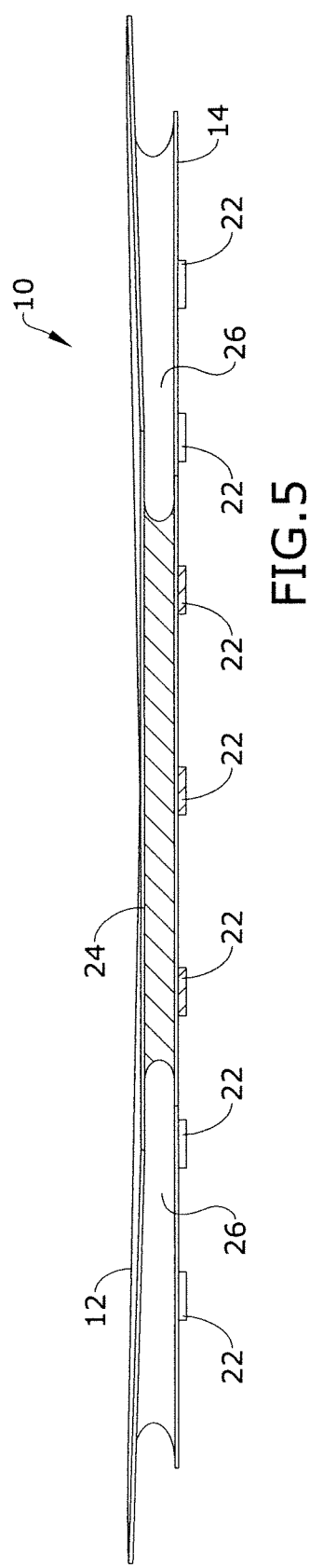

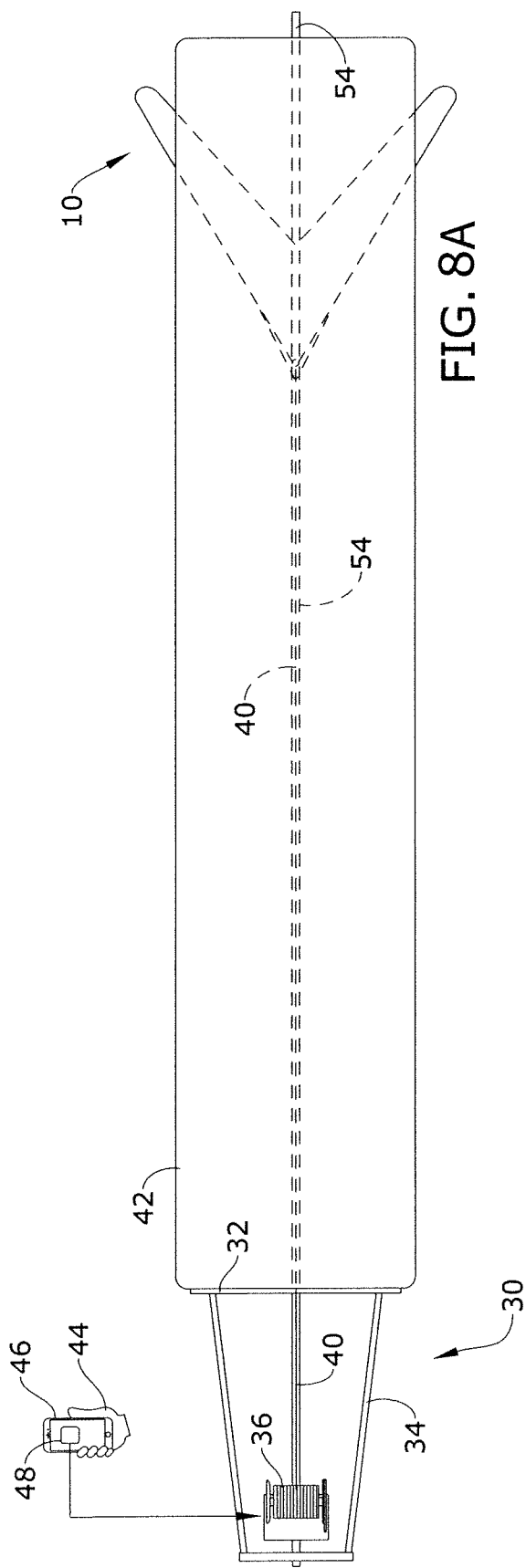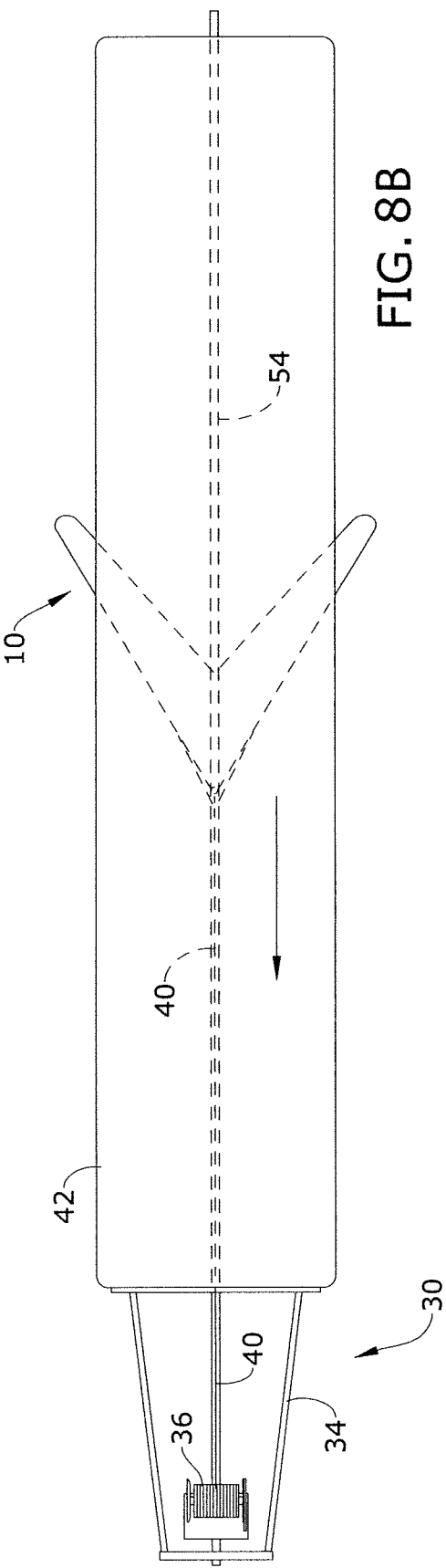

DEVICE AND METHOD FOR REMOVING AGRICULTURAL STORAGE BAG FROM STORED PRODUCT

RELATED APPLICATION

This application claims priority to provisional patent application U.S. Ser. No. 63/175,266 filed on Apr. 15, 2021, the entire contents of which is herein incorporated by reference.

BACKGROUND

The embodiments described herein relate generally to agricultural tools and products and, more particularly, to a method and device for removing a plastic agricultural storage bag layer from a stored product.

During the unloading of a product from agricultural bags with scooping equipment, the plastic bag material resting on the ground results in a frustrating hindrance to efficient scooping/unloading of the product. More specifically, farmers must constantly try to avoid catching the bottom (ground-contacting) plastic layer until a large section of the product has been cleared away. This section is then scooped and torn away so that they can continue to scoop material from the ground surface, which is typically concrete or asphalt. In order to manually remove the plastic material from the product, farmers must repeatedly exit their tractors/scooping equipment. This process results in a large amount of shredded and fragmented pieces of plastic waste that farmers must also dispose of properly.

While there are existing devices, such as that shown in U.S. Patent Application Publication No. 2008/0290199 to Schertz et al., aimed at solving this problem, they do not function for heavier agricultural product, such as silage or moist products.

Therefore, what is needed is a device and method for removing the agricultural storage bag automatically, thus enabling a farmer to quickly and efficiently scoop any agricultural material directly from the ground without any interference of the ground contacting layer of the storage bag plastic.

SUMMARY

Some embodiments of the present disclosure include a device for removing an agricultural storage bag from a stored product. The device may include a cutter assembly operatively attached to a pulling assembly. The pulling assembly may be configured to pull the cutter assembly along the resting surface of the agricultural storage bag to remove the agricultural storage bag from the stored product. The pulling assembly may include a stop plate, a frame, and a winch mounted to the frame, as well as a recessed channel to allow the cable to avoid contact pressure from the agricultural storage bag. The cutter assembly may include a skid, a cutter blade attached to a top surface of the skid, and a fanning mechanism attached to the top surface of the skid.

BRIEF DESCRIPTION OF THE FIGURES

The detailed description of some embodiments of the invention is made below with reference to the accompanying figures, wherein like numerals represent corresponding parts of the figures.

FIG. 3 is a front view of an embodiment of cutter assembly 10.

FIG. 4 is a section view of an embodiment of cutter assembly 10, taken along line 4-4 in FIG. 2.

FIG. 5 is a section view of an embodiment of cutter assembly 10, taken along line 5-5 in FIG. 4.

FIG. 8A is a schematic top view of one embodiment of the present disclosure.

FIG. 8B is a schematic top view of one embodiment of the present disclosure.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as to remove a plastic agricultural storage bag layer from a stored product and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-10, some embodiments of the present disclosure include a method and device for removing an agricultural storage bag 42 from a stored product 50, the device comprising a cutter assembly 10 operatively attached to a pulling assembly 30, wherein the pulling assembly 30 is configured to pull the cutter assembly 10 along a surface of the agricultural storage bag 42 to remove the agricultural storage bag 42 from the stored product 50.

Figure 1:
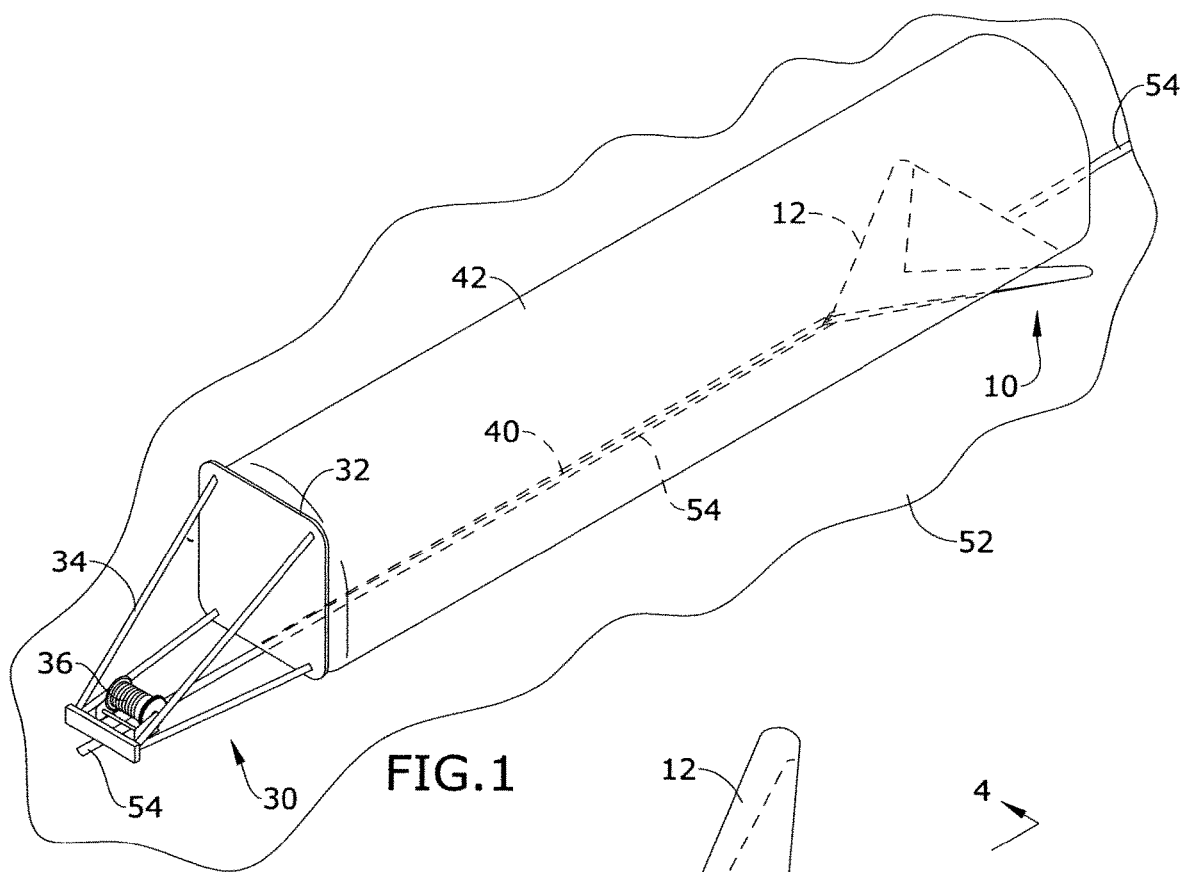
FIG. 1 is a perspective view of one embodiment of the present disclosure, shown in use.
Figure 2:
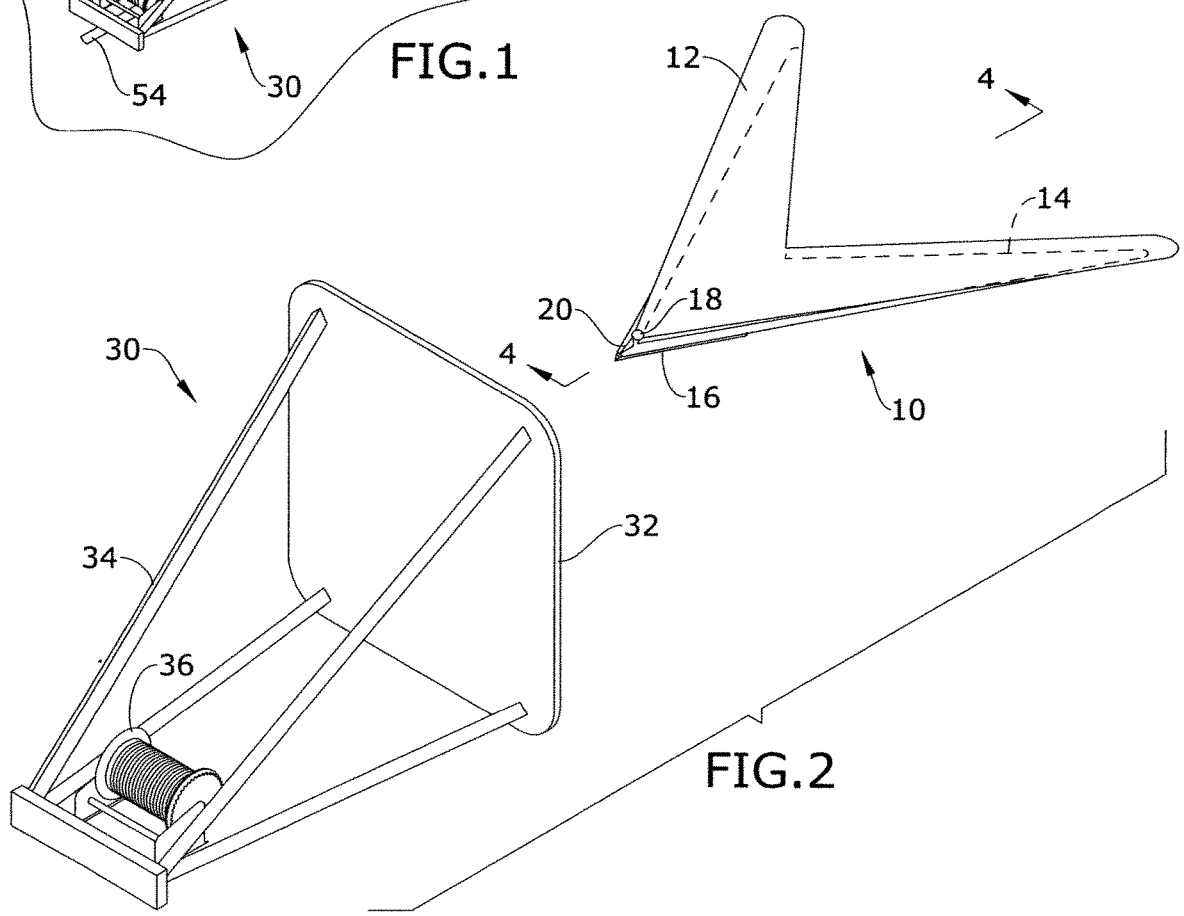
FIG. 2 is a perspective view of one embodiment of the present disclosure.
Figure 6:
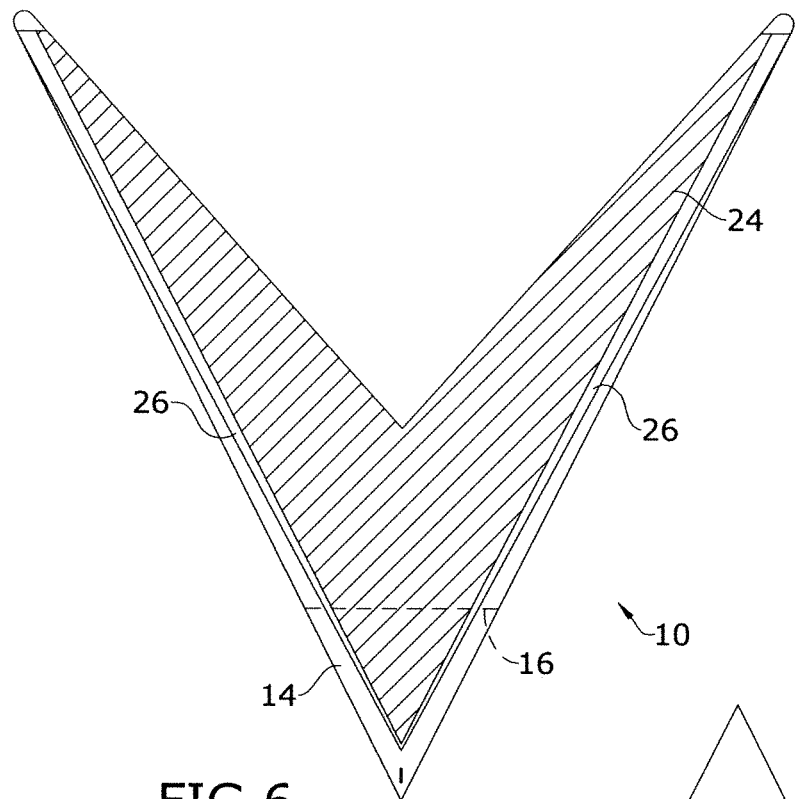
FIG. 6 is a section view of an embodiment of cutter assembly 10, taken along line 6-6—in FIG. 3.

As shown in, for example, FIG. 2, the pulling assembly 30 may comprise a substantially planar stop plate 32 configured to be oriented substantially perpendicularly from the ground, wherein a first surface of the plate 32 is designed to be positioned against an end of the stored product 50, a frame 34 extending from a second surface of the plate 32, wherein the second surface is opposite the first surface, a winch 36 operatively attached to the frame 34, and a cable 40 operatively engaged with the winch 36. More specifically, the frame 34 may comprise a plurality of support bars extending from the plate 32. For example, the plate may be a square or rectangle with rounded corners and a support bar may extend outward from the plate 32 proximate to each corner thereof. A first pair of support bars may extend substantially perpendicularly from two corners of the plate 32, wherein the first pair of support bars may taper towards each other and may be substantially parallel to the ground 52 in use. A second pair of support bars may extend at a downward angle from two other corners of the plate such that the second pair of support bars each meet up with a respective support bar of the first pair of support bars. The winch 36 may be operatively mounted to the frame 34 proximate to distal ends of the support bars.

Figure 7:
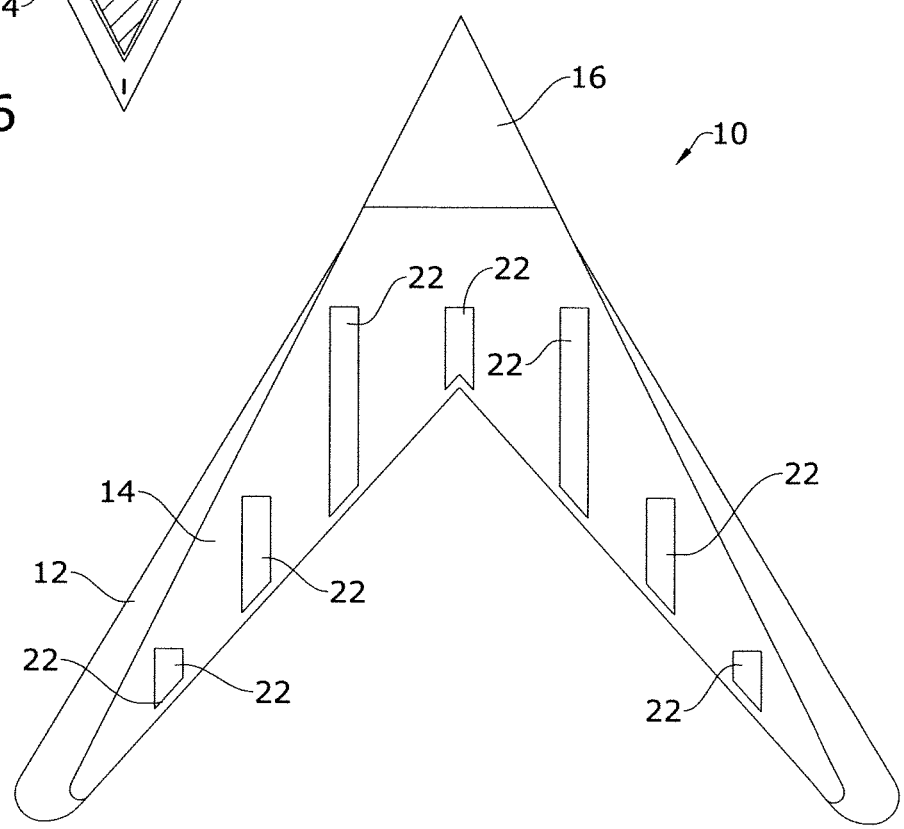
FIG. 7 is a bottom view of an embodiment of cutter assembly 10.
Figure 9:
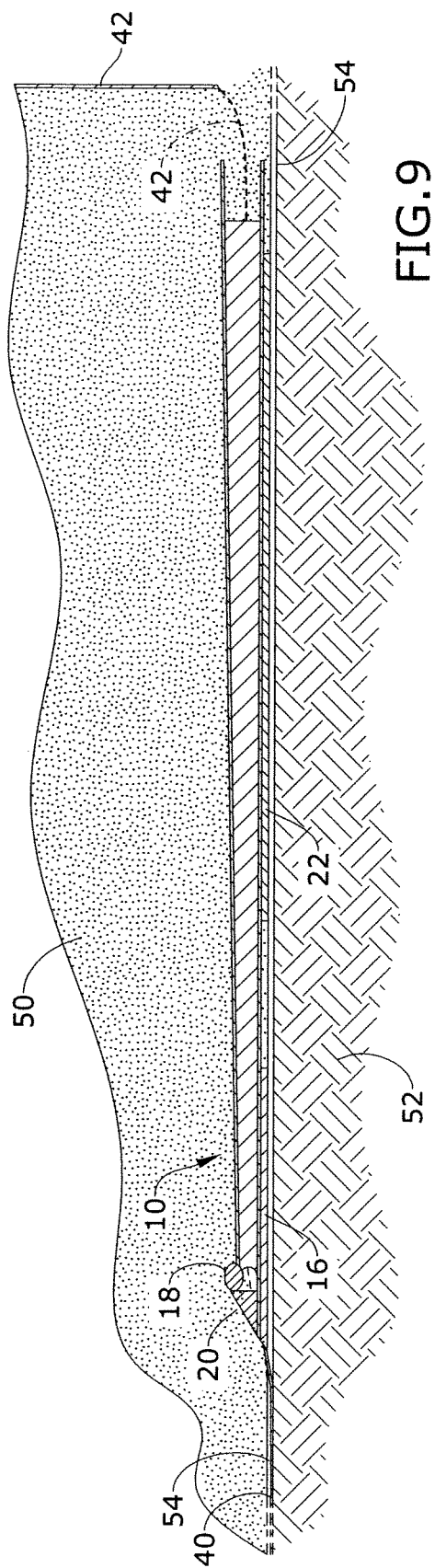
FIG. 9 is a section view of one embodiment of the present disclosure.

As shown in, for example, FIGS. 2-7, the cutter assembly 10 may comprise a substantially V-shaped assembly, wherein a central point of the V-shape is oriented toward the pulling assembly 30 during use. More specifically, the cutter assembly 10 may comprise a triangular skid plate 16; a cutting blade 20 extending upwards from a front corner of the triangular skid plate 16; and a fanning mechanism, such as a V-shaped fanning blade, attached to a top surface of and extending past a back edge of the triangular skid plate 16. The cutter assembly 10 may further comprise a spreader ball 18 attached to a front point of the fanning mechanism proximate to the cutting blade 20. In embodiments, the V-shaped fanning blade may comprise a V-shaped fanning blade body 24 sandwiched between a bottom fanning blade plate 14 and a top fanning blade plate 12. As shown in the Figures, the top fanning blade plate 12 may be larger than the bottom fanning blade plate 14 and the fanning blade body 24 may be recessed back from the edges of the top fanning blade plate 12 and the bottom fanning blade plate 14, thus forming progressive flange slot 26. The cutter assembly 10 may further comprise a plurality of skids 22 attached to a bottom surface of the bottom fanning blade plate 14, as shown in FIG. 7, wherein the plurality of skids 22 are configured to reduce friction between the cutter assembly 10 and the ground surface. While not shown in the Figures, alternate friction-reducing means, such as rollers, belts, and the like, may be used in place of the plurality of skids 22. A cable attachment point 28 may be attached to a front edge of the skid plate 16, such that the cable attachment point 28 is below the cutting blade 20. During use, a cable 40 may be attached to the cable attachment point 28 and extend to the winch 36, wherein it is operatively engaged thereto. Manual or automatic operation of the winch 36 may, therefore, cause result in movement of the cutter assembly 10.

The components of the device of the present disclosure may be made of any suitable materials and may have any suitable or necessary dimensions to achieve the intended objective.

Figure 10:
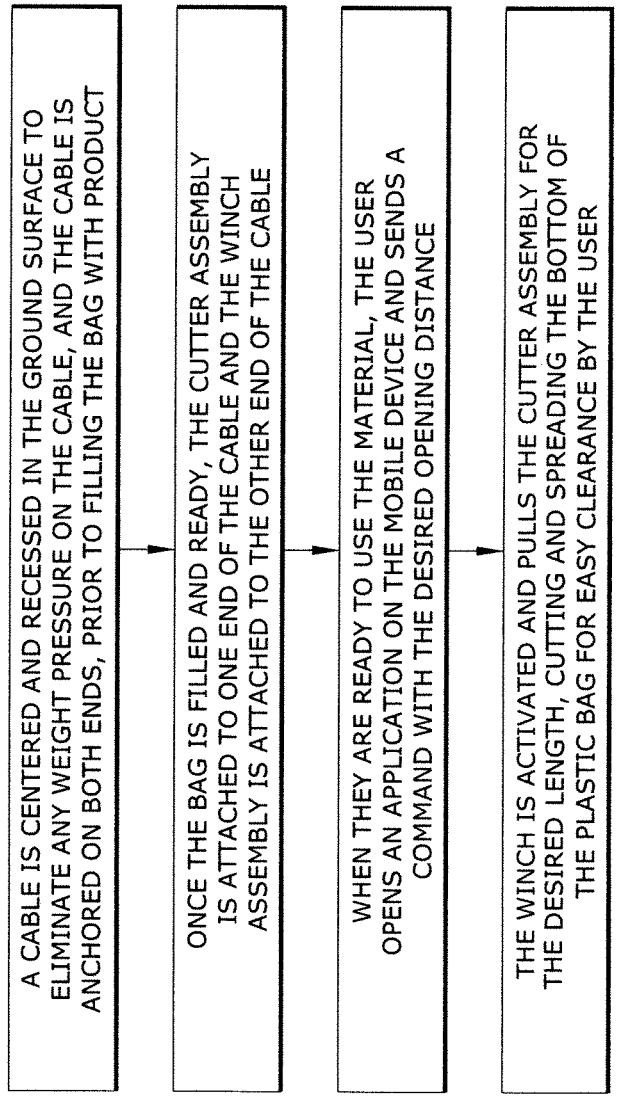
FIG. 10 is a flow chart describing use of one embodiment of the present disclosure.

As described in FIG. 10, to use the device of the present disclosure, a cable 40 may be centered in a recessed channel 54 in the ground 52, which will eliminate or reduce weight and pressure on the cable 40 by the stored product 50. The cable 40 may be anchored on both ends. An agricultural bag 42 may be placed on top of the recessed cable 40 and then filled with the desired agricultural product. Once the bag 42 is filled and ready, the cutter assembly 10 may be attached to a first end of the cable 40 and the winch 36 may be attached to a second end of the cable 40 with the stop plate 32 positioned adjacent to an end of the stored product. When the agricultural material is ready to be used, the user may operate the winch 36, causing the cutter assembly 10 to be pulled by the cable 40 under the agricultural bag 42, wherein the cutting blade 20 on the cutter assembly 10 slices the bag 42 and the spreader ball 18, together with the fanning mechanism, spreads the bottom of the bag 42. In embodiments, the cutter assembly 10 may be pulled along the entire bottom surface of the bag 42 or only upon the length of the bag 42 that is desired to be removed in preparation for product removal with, for example, scooping equipment. Moreover, because the bag is sliced along a length thereof, the bag turns into a large layer of plastic, which may be used to cover up and remaining, unused product until it is needed. Upon completion of emptying the bag 42, the cutter assembly 10 may be nested within the pulling assembly (not shown) for easy storage, transport, or the like.

As mentioned above, the winch 36 may be operated either manually or automatically. In fact, the winch 36 is not particularly limited and may comprise any suitable winch. In some embodiments, as shown in FIG. 8A, the winch 36 may be operatively attached to an application 48 on an electronic device 46, such as a smart phone, tablet, or computer, wherein a user 44 may activate the winch 36 from afar, if needed or desired.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A device for removing an agricultural storage bag from a stored product, the device comprising:
    a cutter assembly operatively attached to a pulling assembly,
    wherein:
        the pulling assembly is configured to pull the cutter assembly along a resting surface of the agricultural storage bag to remove the agricultural storage bag from the stored product;
        the cutter assembly comprises a skid, a cutter blade attached to a top surface of the skid and a fanning mechanism attached to the top surface of the skid;
        the skid is a triangular skid; and
        the fanning mechanism is V-shaped and comprises a fanning blade sandwiched between a bottom fanning blade plate and a top fanning blade plate.

2. The device of claim 1, wherein:
    the top fanning blade plate is larger than the bottom fanning blade plate; and
    a fanning blade body is recessed back from outer edges of the top fanning blade plate and the bottom fanning blade plate, thus forming progressive flange slot running along a length of the fanning mechanism.

3. The device of claim 1, wherein the cutter assembly further comprises a friction-reducing device attached to a bottom surface of the bottom fanning blade plate, the friction-reducing device being a member selected from the group consisting of a plurality of substantially parallel skids, rollers, belts, and a combination thereof.

4. The device of claim 1, further comprising a cable attachment point attached to a front edge of the skid plate.

5. The device of claim 1, wherein the pulling assembly comprises:
    a stop plate configured to be oriented substantially perpendicularly from a ground surface, the stop plate comprising a first surface designed to be positioned against an end of the stored product;

a frame extending from a second surface of the plate, wherein the second surface is opposite the first surface; and a winch operatively attached to the frame.

6. The device of claim 4, wherein:

the frame comprises a plurality of support bars extending from the plate; and the winch is mounted to the frame proximal to distal ends of each of the plurality of support bars.

7. The device of claim 1, further comprising a cable attaching the cutter assembly to the pulling assembly.

8. The device of claim 1, further comprising an electronic device operatively attached to the pulling assembly, providing for automatic operation of the pulling assembly.

* * * * *